United States Patent
Minturn et al.

(10) Patent No.: US 7,581,042 B2
(45) Date of Patent: Aug. 25, 2009

(54) I/O HUB RESIDENT CACHE LINE MONITOR AND DEVICE REGISTER UPDATE

(75) Inventors: Dave Minturn, Hillsboro, OR (US); James B. Crossland, Banks, OR (US); Sujoy Sen, Portland, OR (US); Greg Cummings, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 11/026,928

(22) Filed: Dec. 29, 2004

(65) Prior Publication Data

US 2006/0143333 A1    Jun. 29, 2006

(51) Int. Cl.
*G06F 3/00* (2006.01)
(52) U.S. Cl. .................. 710/52; 711/141; 711/142
(58) Field of Classification Search ............ 710/19, 710/30, 52; 711/138, 208, 141, 142
See application file for complete search history.

(56) References Cited

U.S. PATENT DOCUMENTS

| | | | | |
|---|---|---|---|---|
| 5,515,522 A | * | 5/1996 | Bridges et al. | 711/141 |
| 5,557,769 A | * | 9/1996 | Bailey et al. | 711/146 |
| 5,673,414 A | * | 9/1997 | Amini et al. | 711/146 |
| 6,195,730 B1 | * | 2/2001 | West | 711/121 |
| 2004/0193757 A1 | | 9/2004 | Creta et al. | |
| 2005/0198400 A1 | | 9/2005 | Minturn | |
| 2005/0228922 A1 | | 10/2005 | Tsao et al. | |
| 2006/0004904 A1 | | 1/2006 | Sarangam et al. | |
| 2006/0004933 A1 | | 1/2006 | Sen et al. | |
| 2006/0095609 A1 | | 5/2006 | Radhakrishnan et al. | |
| 2006/0136611 A1 | | 6/2006 | Futral et al. | |

OTHER PUBLICATIONS

Allan McNaughton, AMD Hypertransport Bus: Transport Your Application to Hyper Performance, Sep. 29, 2003, AMD http://developer.amd.com/articlex.jsp?id=70.*
John Deatherage, Streamline Design Efforts with the New SPI4-2 Interface, Sep. 2002, Intel Developer Update Magazine.*

* cited by examiner

*Primary Examiner*—Henry W. H. Tsai
*Assistant Examiner*—Elias Mamo
(74) *Attorney, Agent, or Firm*—David P. McAbee

(57) ABSTRACT

The apparatus and method described herein are for enabling cacheable writes to I/O device registers. A cache monitor, which may be present in a controller hub, monitors accesses to cache lines in a microprocessor. The cache monitor also associates cache lines in the microprocessor with I/O device registers. When an access to certain cache lines are detected, the cache monitor is operable to receive the contents of the cache line and write those contents to an associated I/O device register. Therefore, a microprocessor may write to a cache line, instead of making an uncacheable write to the I/O device register directly.

29 Claims, 4 Drawing Sheets

I/O HUB RESIDENT CACHE LINE MONITOR AND DEVICE REGISTER UPDATE

FIELD

This invention relates to the field of computer systems and, in particular, to cacheable writes to I/O device registers.

BACKGROUND

As computer systems advance, the input/output (I/O) capabilities of computers become more demanding. A typical computer system has a number of I/O devices, such as network interface controllers, universal serial bus controllers, video controllers, PCI devices, and PCI express devices, that facilitate communication between users, computers, and networks. Yet, to support the plethora of operating environments that I/O devices are required to function in, developers often create software device drivers to provide specific support for each I/O device.

During execution of a device driver it is common to update device registers present on the I/O devices. Current computer systems typically map device registers in I/O devices into uncacheable (UC) memory pages. When a device driver needs to write to a device register, a microprocessor executing the device driver usually performs a write operation to a UC memory address. As an example, when writing to a specific device register, the microprocessor may write to an offset within a page of the UC memory that corresponds to the specific device register.

However, using a UC memory structure may cause serialization of a microprocessor pipeline. During a UC write, the processor pipeline is potentially forced to stall until the write operations is complete. As a specific example, during packet reception, a network interface controller (NIC) device driver may write to as many as four device registers per packet; the device drivers including the direct memory access (DMA) engine doorbell, the NIC Rx tail update, the interrupt enable, and the Tx tail update device registers. Assuming a typical UC write incurs a pipeline stall of approximately 200 ms, the aforementioned four UC writes may incur as much as a 800 ms stall in the processor pipeline, which adversely affects processor performance.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as specific I/O devices, monitor table implementations, cache states, and other details in order to provide a thorough understanding of the present invention. It will be apparent, however, to one skilled in the art that these specific details need not be employed to practice the present invention. In other instances, well known components or methods, such as well-known caching schemes, processor pipeline execution architecture, and interconnect protocols have not been described in detail in order to avoid unnecessarily obscuring the present invention.

The apparatus and method described herein are for caching I/O device register writes to reduce potential stalls in a microprocessor's pipeline. It is readily apparent to one skilled in the art, that the method and apparatus disclosed herein may be implemented in any system using a processor and an I/O device. For example, the apparatus and methods described herein may be used in an embedded processor system, which has an I/O device register. As an alternative, the method and apparatus described herein may be used in multiprocessor system having multiple I/O devices, each I/O device having multiple device registers.

Figure 1:
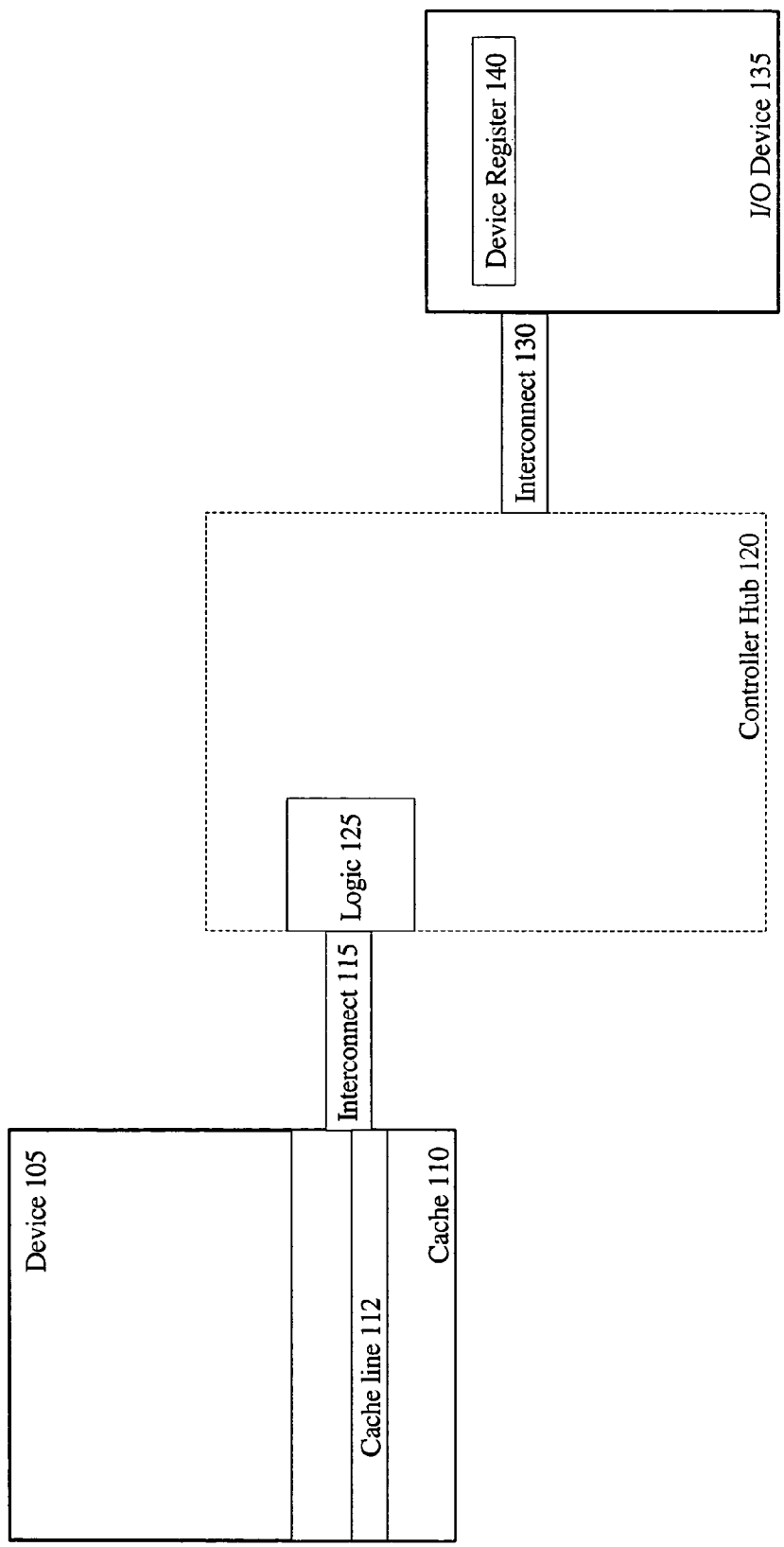
FIG. 1 illustrates a controller hub coupled between a first device having a cache and an I/O device.

FIG. 1 illustrates an embodiment of a system for caching device register writes. Controller hub 120 is coupled between device 105 and I/O device 135 by interconnects 115 and 130, respectively. Interconnect 115 is typically a serial or parallel bus structure implementing a bus protocol. As a specific example, interconnect 115 is a front-side bus implementing a common-standard-interface (CSI) protocol. Interconnect 130 is an I/O bus to connect to I/O device 135. I/O device 135 includes components such as a peripheral component interconnect (PCI) component, peripheral component interconnect express (PCI-E) component, or a universal serial bus (USB) component, and specifically, a network interface controller, network adapter, video tuner card, audio controller, audio device, storage device, video controller, or other common system component.

Device 105 may be any type of processing element, such as a microprocessor, embedded processor, co-processor, or other logic capable of executing code. As a specific example, device 105 is a microprocessor. Microprocessor 105 is typically capable of out-of-order speculative execution; however, device 105 is not so limited. In fact, alternatively, device 105 is capable of only in-order execution and/or non-speculative execution. Additionally, device 105 may be a single die with multiple processing cores and/or multiple logical processors operable to execute a plurality of software threads in parallel.

Also illustrated in device 105, is cache 110. Usually, device 105 comprises a plurality of different levels of caches. As an example, device 105 has a low-level instruction and data cache coupled to fetch, decode, and execution units. Device 105 also has a higher level cache, such as cache 110, coupled between the lower level caches and a bus unit to communicate to external devices through interconnect 115. Alternatively, cache 110 is a single cache that is associated with device 105. Often a cache, such cache 110, comprises high speed static random access memory (SRAM) cells to store recent data, instructions, and/or decoded instructions. Cache 110 may also be organized as a direct mapped, fully associative, or set associative cache, as well as any hybrid organization.

Cache 110 has a plurality of cache lines, such as cache line 112. Cache line 112 generally has two portions: (1) a tag value representing at least a portion of the address location of the cached value and (2) the cached value itself. Cache line 112 may also include any other fields or values stored in a cache line/entry. In a set associative cache, multiple lines within different ways of cache are grouped together in a set, while in a direct mapped or fully associative cache lines are typically not grouped. Therefore, a cache line may refer to a portion of a cache line, such as the tag field or cached value, a single line of cache in, or a group of lines/entries within a single set in a set oriented cache.

Interconnect 115 couples device 105 to controller hub 120. Controller hub 120, also commonly referred to as a chipset, usually includes multiple integrated circuits. For example, controller hub 120 includes a memory controller hub, also referred to as a north-bridge, on a first integrated circuit providing coupling to system memory. Hub 120 may also include an input/output hub, also referred to as a south-bridge on a second integrated circuit. Placement of logic 125 in controller hub 120 is purely illustrative, as logic 125 may be present on device 105, a motherboard, a memory controller hub, an input output hub, or distributed over the aforementioned components. As a specific example, logic 125 is a cache monitor in an input/output hub.

In one embodiment, logic 125 allows device 105 to write to cache 112 when performing a write to device register 140, instead of making an uncacheable (UC) write to device register 140 directly. Logic 125 associates/maps cache line 112 in cache 110 with I/O device 135, and specifically, with device register 140 in I/O device 135. Additionally, logic 125 monitors accesses, such as a write operation, to cache line 112. An access to cache line 112 triggers logic 125. After triggering, logic 125 receives the data written to cache line 112 by device 105 and is operable to write the data to device register 140 in I/O device 135.

Figure 2:
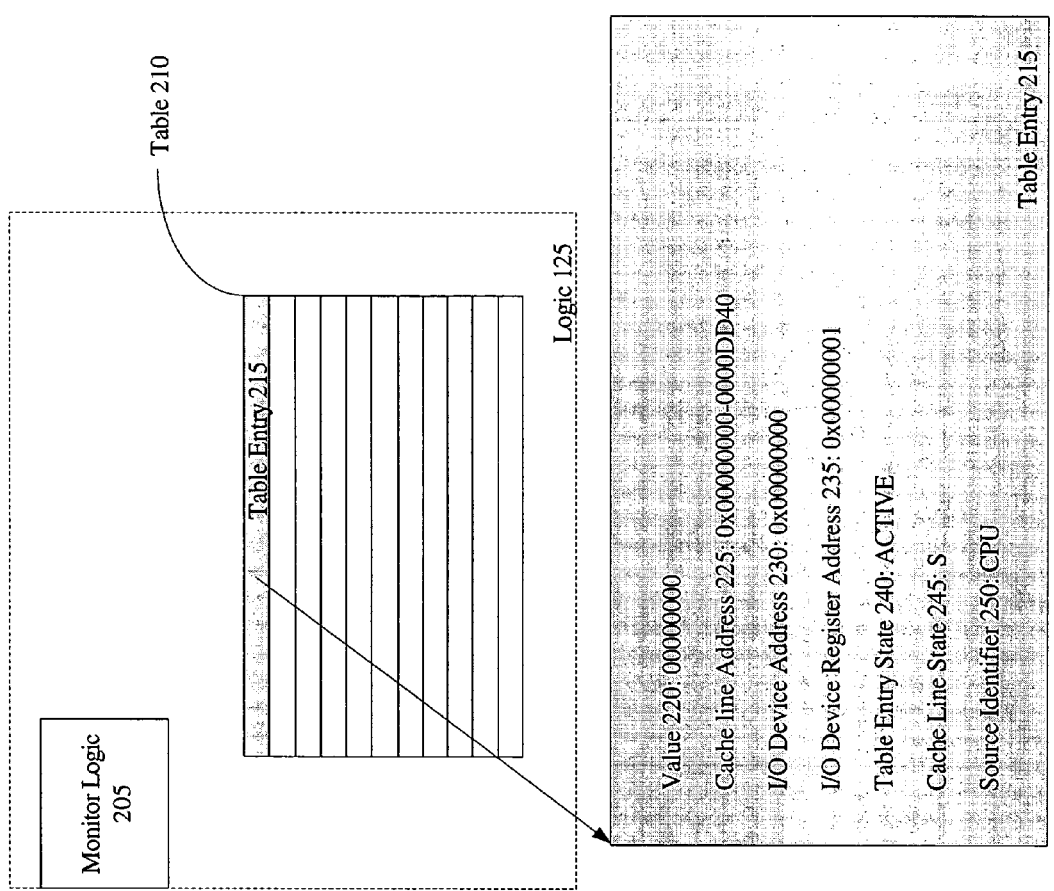
FIG. 2 illustrates an embodiment of logic for enabling and monitoring cacheable writes to I/O device registers.

Turning to FIG. 2, a specific embodiment of logic 125 is illustrated. Table 210 is shown having a plurality of table entries. Table 210 may also be referred to as a monitor table, a cache monitor table, or cache state monitor table. Table entry 215 associates a data location, such as cache line 112, with I/O device 135 and device register 140. As illustrated, table entry 215 comprises seven fields: value 220, cache line address 225, I/O device address 230, I/O device register address 235, table entry state 240, cache line state 245, and source identifier 250. A data location, such as cache line 112, is mapped to, i.e. associated with, I/O device 135 and device register 140 in table entry 215.

Table entry 215 stores the address of a cache line to be tracked and monitored in cache line address 225. Table entry 215 also stores a corresponding address of I/O device 135 in I/O device address field 230 and a corresponding address of I/O device register 140 in I/O device register address field 235. As an example, FIG. 2 shows an illustrative cache line address of 0x00000000-0000DD40 to represent cache line 112, an I/O device address of 0x00000000 to represent I/O device 135, and an I/O device register address of 0x00000001 to represent device register 140. Therefore, any access monitored by cache monitor 125 to cache line 112 is associated with I/O device 135 and device register 140 in table entry 215.

Table entry also stores a value in value field 220. Value field 220 stores whatever value/data is received from device 105 by monitor logic 205. Therefore, value field 220 commonly stores the value written to cache line 112 by device 105 during execution of a device driver. For example, a value 00000000 is written to cache line 112, the write/access is monitored by monitor logic 205 either directly or by generation of a snoop message, which may be the result of an access/write operation. Monitor logic 205 then receives the value 00000000 from device 105 and stores that value in value field 220 within table entry 215. Later value 00000000 may be written to the corresponding device register address in field 235. Monitoring of cache 110, receiving a value from device 105, and writing the value to device register 140 will be discussed in more detail in reference to FIGS. 3-4.

Also illustrated in table entry 215, is cache line state field 245. Logic 125 optionally tracks the state of the cache line monitored by logic 125. In one embodiment, cache 110 uses modified, exclusive, shared, and invalid (MESI) state bits to identify the state of its cache lines. MESI bits are commonly used for cache coherency schemes in computer systems and often represent a modified, exclusive, shared, or invalid state of a cache line. An example shown in FIG. 2 is cache line state field 245 having the value "S" representing a shared state of the cache line referenced by cache line address 0x00000000-0000DD40. In another embodiment, cache 110 uses a different cache coherency protocol that is monitored in table 210's cache line state fields.

The state of table entry 215 may be stored in table entry state field 240. In one embodiment, table entry 215 has three states, an inactive, an active, and a data expected state; however, table entry 215 may have only two states or any number of states. When monitor logic monitors an access to cache line 112, which is referenced by cache line address 225, monitor logic 205 triggers table entry 215 to enter, i.e. change to, a data expected state.

As stated above, monitor logic 205 monitors/tracks accesses to cache lines stored in table 210's table entries. In one embodiment, monitor logic 205 directly tracks accesses to cache line 112, where an access is a request for ownership of cache line 112. One example of directly monitoring cache line 112 is to monitor requests for ownership of cache line 112. When device 105 requests ownership of cache line 112, monitor logic 205 then triggers table entry 215 into a data expected state.

In another embodiment, monitor logic 205 monitors snoop messages generated by device 105, where an access constitutes a snoop that references a monitored cache line. For example, when a write to cache line 112 results in a hit or miss, where cache line 112 is in a modified, exclusive, shared, or invalid state, device 105 generates a snoop message referencing cache line 112 and send the snoop message over interconnect 115. Monitor logic 205 receives the snoop message referencing cache line 112 and triggers table entry 215 into a data expected state.

Once in a data expected state, monitor logic 205 checks source identifier field 250. If source identifier field 250 has not receive the value/data written to cache line 112 then source identifier field 250 represents device 105 as the source. However, if the value written to cache line 112 is static data or has been received and stored in table entry 215, then source identifier field 250 represents the controller hub, monitor logic 205, logic 225, or simply a value, such as static data, as the source.

As an example, if a snoop message is received by logic 205 referencing cache line 112, then table entry 215 is triggered into a data expected state. During a period where monitor logic 205 is receiving the contents of cache line 112, discussed in more detail in reference to FIG. 3, table entry 215 has a source identifier representing device 105, which is shown in FIG. 2 as CPU. Once the contents of cache line 112 are received, the contents are stored to table entry 215 and later written to device register 140, referenced in I/O device address field 230. In contrast, if source identifier field 250 is checked after triggering table entry into a data expected state, and source identifier field 250 represents static data, then the value currently stored in value field 220 is written to the I/O device register referenced by I/O device address field 230. In either case, after the value is written to an I/O device register table entry 215 is returned to an active state.

In a multiprocessor system or a multi-core system, where separate caches are being monitored, source identifier field 250 may store one value to represent an external source and another value to represent static data in table entry 215. In the alternative, source identifier may individually identify each external source with a physical or virtual processor or core ID.

In one embodiment, at least some of the fields in table entry 215 are initialized by a controller hub or input-output hub device driver, where the device driver populates the field in table entry 215. Furthermore, during execution of a device driver, any field within table entry 215 are updated by the contents of a cache line stored to table entry 215. As an illustration, if a cache line is 64 bytes of data, a first number of bytes, such as 32, include a value to populate value field 220, and the reaming bytes, 32 in this case, populate I/O device and device register addresses 230 and 235.

Figure 3:
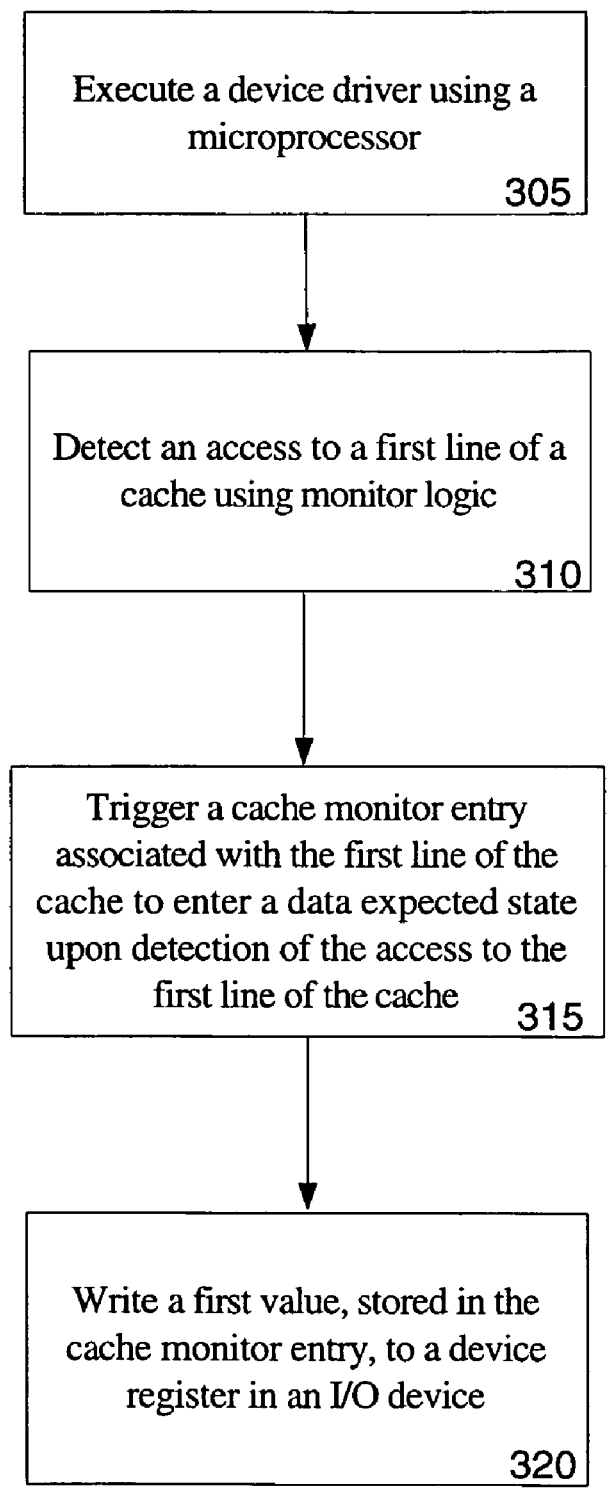
FIG. 3 illustrates an embodiment of a flow diagram for writing to an I/O device register using cacheable memory.

Turning to FIG. 3, an embodiment of a flow diagram for writing to an I/O device register using cacheable memory is illustrated. In block 305, a device driver is executed using a microprocessor. In block 310 an access to a first line of a cache in the microprocessor is detected using monitor logic. An access may be any request for ownership of the first cache line, write/store operation to the first cache line, or any other cache access that generates a snoop message in reference to the first cache line. For example, a microprocessor that writes to a cache line with address 0x00000000-0000DD40 and has a cache-miss or a cache hit when the cache line is in an invalid or shared state sends out a snoop message. A cache monitor or monitor logic monitors the access, which may include tracking ownership requests or simply receiving the generated snoop message.

In block 315, a cache monitor entry associated with the first line of cache is triggered, resulting in the cache monitor entry entering into a data expected upon detection of the access to the first line of cache. As stated above, the cache monitor entry is associated with the first line of cache when the address or reference to the first line of cache is stored in the cache monitor entry. Additionally, the first line of cache is associated with an I/O device and device register by storing the addresses of the device and device register in the same cache monitor entry.

If a source identifier field in the cache monitor entry indicates static data upon entering a data expected state, then the value stored in the cache monitor entry is written to the I/O device register addressed by the device register address stored in the cache entry as shown in block 320. After writing the value stored in the cache monitor entry, the cache monitor entry is returned to an active state However, if the source identifier field represents an external source, e.g. the data from the first cache line has not been received, then the register update in block 320 is postponed until the first cache line data arrives. In "receiving" the first cache line, monitor logic may engage in a communication protocol with the microprocessor to obtain the contents of the first cache line. As an illustrative example the following steps may occur. First, the monitor logic responds to the snoop message signaling that the first cache line is not in a modified state. Second, the CPU receiving the signal from the monitor logic transitions the first cache line into an exclusive state and then a modified state. Third, the monitor logic will request the first cache line from the microprocessor. Fourth, upon receipt of the request of the first cache line by the monitor logic and competition of the transition to a modified state, the microprocessor will further transition the cache line to an invalid state and send the contents of the first cache line to the monitor logic.

After receiving the first cache line, the contents of the cache line are stored to the cache monitor entry. All or a portion of the first cache line is stored in the value field as a first value, while any remaining portions may also be used to populate the other field in the cache monitor entry. Next, as shown in block 320, the first value is written to a device register in an I/O device referenced by the cache monitor entry fields. The cache monitor entry is then returned to an active state from the data expected state.

As mentioned above the microprocessor is potentially capable of speculative execution and branch prediction. Speculative execution and branch prediction are well-known and typically include predicting the outcome of a condition and fetching/executing predicted instructions before the condition is resolved. If a failed branch prediction occurs, i.e. a certain branch is predicted, predicted instructions are speculatively executed, and if the predicted branch is incorrect then the speculative results are discarded. However, speculative execution in the processor may cause "false triggers." A false trigger may occur where there is a speculative access to a cache line, such as speculative ownership of a cache line is gained, and the speculative results are discarded. Therefore, a cache monitor may determine whether a trigger was a false trigger and potentially not make a register update if a false trigger is determined.

In one embodiment a false trigger is detected using a "valid byte" in a cache line's data. In this embodiment, when a speculative access occurs the valid byte has a first value that the monitor logic decodes to represent a false trigger. In contrast, if it is a non-speculative access to the cache line, the valid byte has a second value that represents a non-speculative access. In another embodiment, a false trigger is determined by comparing the index of a previously written to device register with an index of the currently written to device register. Typically, when executing a device driver a write occurs to an index in a ring structure. As a matter of convention, a single index is usually not written to twice in a row. Therefore, by comparing the previous and current index, a false trigger can be determined if the previous and current index are the same.

Figure 4:
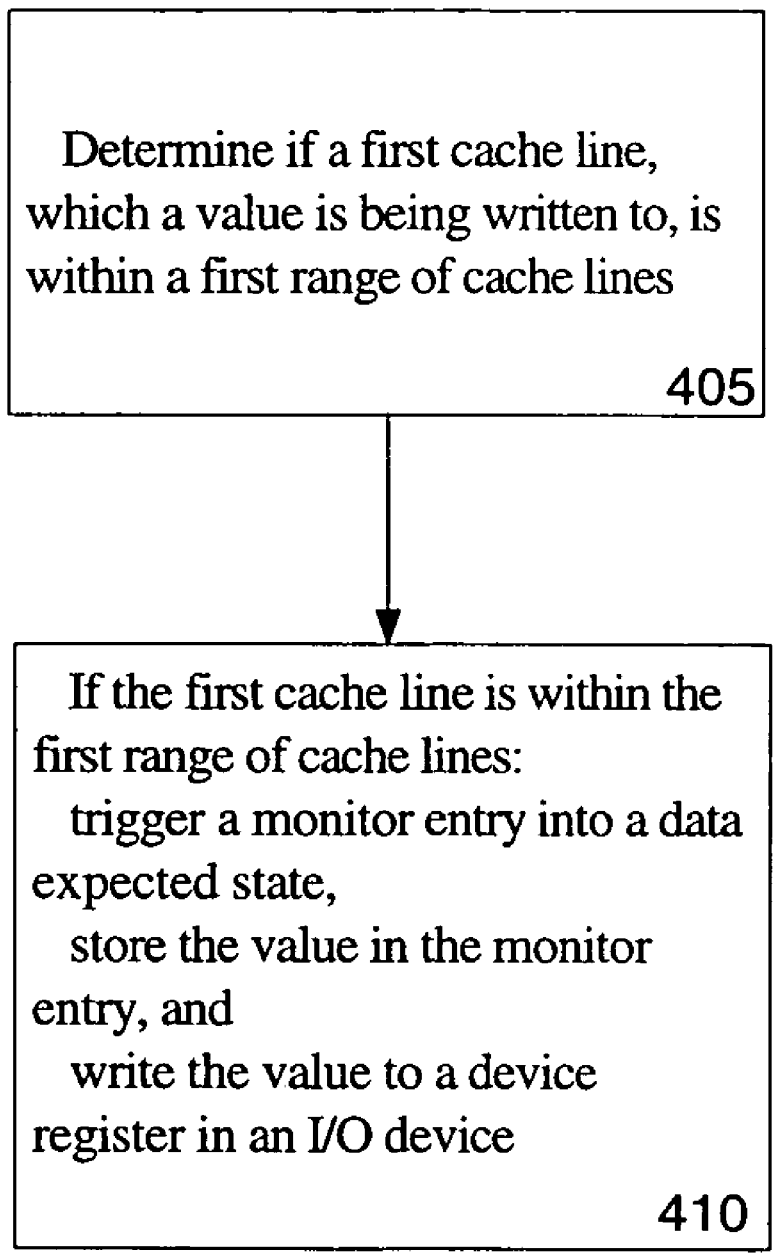
FIG. 4 illustrates another embodiment of a flow diagram for writing to an I/O device register using cacheable memory.

Turning to FIG. 4, an embodiment of a method for enabling cacheable writes to I/O device registers using a multiple level cache monitor is illustrated. In block 405, determining if a first cache line, which is being written to, is within a first range of cache lines. Therefore, the first level of monitoring would monitor a rage of contiguous page address. If the first cache line is not within the first range, upon a quick lookup a potentially faster snoop response may be sent by a cache monitor; therefore, the cache monitor is essentially allowing the write to the first cache line transparently. However, if the first cache line is within the first range of cache lines, then a second level would monitor individual cache lines. Therefore, in block 410, a monitor entry associated with the first cache line is triggered, the value from the first cache line is stored in the monitor entry, and the value is written to a device register in and I/O device.

As mentioned above, potential stalls in a microprocessor's pipeline incurred during uncacheable (UC) writes to I/O device registers are reduced by enabling the microprocessor to make the writes to cache and monitoring those writes. A cache monitor associates a cache line with an I/O device register and when access to the cache line is monitored, the value written to cache by the microprocessor may be obtained/received by the cache monitor, while the processor pipeline is continuing to execute. Therefore, instead of incurring a pipeline stall, the microprocessor merely writes to cache and then continues executing. Furthermore, snoop response time from the cache monitor may be reduced by implementing a multiple level cache monitor, as discussed above.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A controller hub comprising: storage logic to hold a table, the table to include an entry to associate a memory location in a host processor with a storage location in an input/output (I/O) device; monitor logic coupled to the storage logic to monitor an access to the memory location by the host processor, the monitor logic to request a value held in the memory location from the host processor and to store the value in the entry in response to the access to the memory location being completed; and write logic coupled to the monitor logic to provide the value to the I/O device in response to the value being stored in the entry.

2. The apparatus of claim 1, wherein the entry to associate the memory location in the host processor with a storage location in the I/O device comprises the entry to hold an address associated with the memory location and a corresponding address associated with the storage location in the I/O device.

3. The apparatus of claim 2, wherein the entry is also to hold a state of the memory location, a state of the entry, and an identifier for the source of the value.

4. The apparatus of claim 3, wherein state of the memory location is selected from a group consisting of a modified state, an exclusive state, a shared state, and an invalid state.

5. The apparatus of claim 3, wherein the state of the table entry is initialized to an active state and the monitor logic is to update the state of the table entry to a data expected state in response to the monitor logic monitoring the access to the memory location in the host processor.

6. The apparatus of claim 3, wherein the identifier for the source of the data represents the host processor in response to the monitor logic not receiving the value.

7. The apparatus of claim 6, wherein after the monitor logic stores the value in the entry, the monitor logic updates the identifier for the source of the data to a static data state.

8. The apparatus of claim 1, wherein I/O device is selected from a group consisting of a network interface controller, a network adapter, a universal serial bus (USB) device, a TV tuner card, a video controller, an audio device, and a storage device.

9. A controller hub to be coupled between a microprocessor and an input/output (I/O) device, the controller hub to include: storage logic to hold a cache monitor table comprising a cache monitor entry to hold at least an address of a cache line in the microprocessor associated with an address of a device register in the I/O device; and monitor logic associated with the storage logic to monitor a write to the cache line by the microprocessor and to request ownership of the cache line to be provided by the microprocessor after it completes the write to the cache line.

10. The apparatus of claim 9, wherein the cache monitor entry is also to hold a state of the cache line, a state of the cache monitor entry, an address of the I/O device, and a source identifier.

11. The apparatus of claim 10, wherein the state of the cache line is selected from a group consisting of a modified state, an exclusive state, a shared state, and an invalid state.

12. The apparatus of claim 10, wherein the state of the cache monitor entry is transitioned from an active state to a data expected state in response to the monitor logic monitoring a snoop request for the processor to obtain ownership of the cache line, which is associated with the write to the cache line.

13. The apparatus of claim 12, wherein the source identifier represents the microprocessor after the monitor logic monitors the write to the cache line and before a value written to the cache line has not been stored in the cache monitor entry.

14. The apparatus of claim 13, wherein the source identifier represents the controller hub the value has been stored in the cache monitor entry.

15. A system comprising:
a microprocessor including a cache, the cache having a plurality of cache lines; and
a controller hub coupled to the microprocessor through an interconnect, the controller hub including a cache monitor, wherein the cache monitor is to map a first cache line of the plurality of cache lines to a device register in an I/O device coupled to the controller hub, and wherein the cache monitor is to detect a write of a value by the microprocessor to the first cache line and is to request the value from the first cache line in response to detecting the write to the first cache line.

16. The system of claim 15, wherein the cache monitor to map the first cache line to the device register comprises: the cache monitor including a first cache monitor entry to hold an address of the first cache line associated with an address of the device register.

17. The system of claim 16, wherein the address of the first cache line and the address of the device register are stored in the first cache monitor entry during an initialization sequence.

18. The system of claim 15, wherein the interconnect is a front-side bus (FSB).

19. The system of claim 18, wherein front-side bus (FSB) implements a common system interface (CSI) protocol.

20. A method comprising: determining if a cache line in a cache of a processor that a value is to written to is within a range of cache lines; and in response to the cache line being within the range of cache lines: updating a state of a monitor entry in a cache monitor table, held in a controller hub associated with the cache line in a cache monitor table into a data expected state, storing the value in the monitor entry, determining to write the value to a device register in an input/output (I/O) device in response to the monitor entry associated with the cache line holding a reference to the device register in the I/O device, writing the value to the device register in the I/O device, and in response to the cache line not being within the range of cache lines, transparently writing the value to the cache line.

21. The method of claim 20, wherein transparently writing the value to the cache line comprises writing the value to the cache line without updating a state of a monitor entry and without storing the value in the monitor entry.

22. The method of claim 20, wherein the monitor entry is also to hold an address of the cache line, an address of the I/O device, an address of the device register, and a state of the cache line.

23. The method of claim 22, further comprising storing the address of the first cache line in the monitor entry to associate the cache line with the monitor entry during an initialization sequence.

24. A method comprising: executing an input/output (I/O) device driver with a microprocessor; detecting with monitor logic in a controller hub an access to a line of a cache within the microprocessor during the execution of the device driver; updating a state of a cache monitor entry, which is associated with the line of the cache, to a data expected state in response to detecting with monitor logic the access to the line of the cache, wherein the cache monitor entry associates the line of the cache with a reference to an Input/Output (I/O) device register; requesting a value from the line of the cache within the microprocessor in response to detecting with monitor logic the access to the line of the cache; and receiving the value from the microprocessor after the access to the line of the cache completes.

25. The method of claim 24, wherein detecting the access to the line of the cache comprises receiving a snoop message from the microprocessor, the snoop message including a reference to the cache line.

26. The method of claim 25, further comprising:
checking a source identifier held in the cache monitor entry;
waiting until the value is received from the microprocessor in response to requesting the value from the cache line; and
writing the value to the I/O device register after receiving the value from the microprocessor based on the reference to the I/O device register associated with the line of the cache in the cache monitor entry.

27. The method of claim 24, further comprising: determining if updating the state of the cache monitor entry is in response to a false trigger and not requesting the value from the cache line in response to determining updating the state of the cache monitor entry is in response to a false trigger.

28. The method of claim 27, wherein determining if updating the state of the cache monitor entry is in response to a false trigger comprises comparing an index of a previously written to I/O device register to an index of the currently written to I/O device register.

29. The method of claim 26, further comprising: after updating the state of the cache monitor entry to the data expected state transitioning the cache line into an exclusive state, writing the value to the cache line, transitioning the cache line to a modified state, and providing ownership of the cache line to the monitor logic.

* * * * *